B. F. FOSS.
DAIRY PAIL.
APPLICATION FILED FEB. 6, 1913.
1,097,415.
Patented May 19, 1914.
2 SHEETS—SHEET 1.
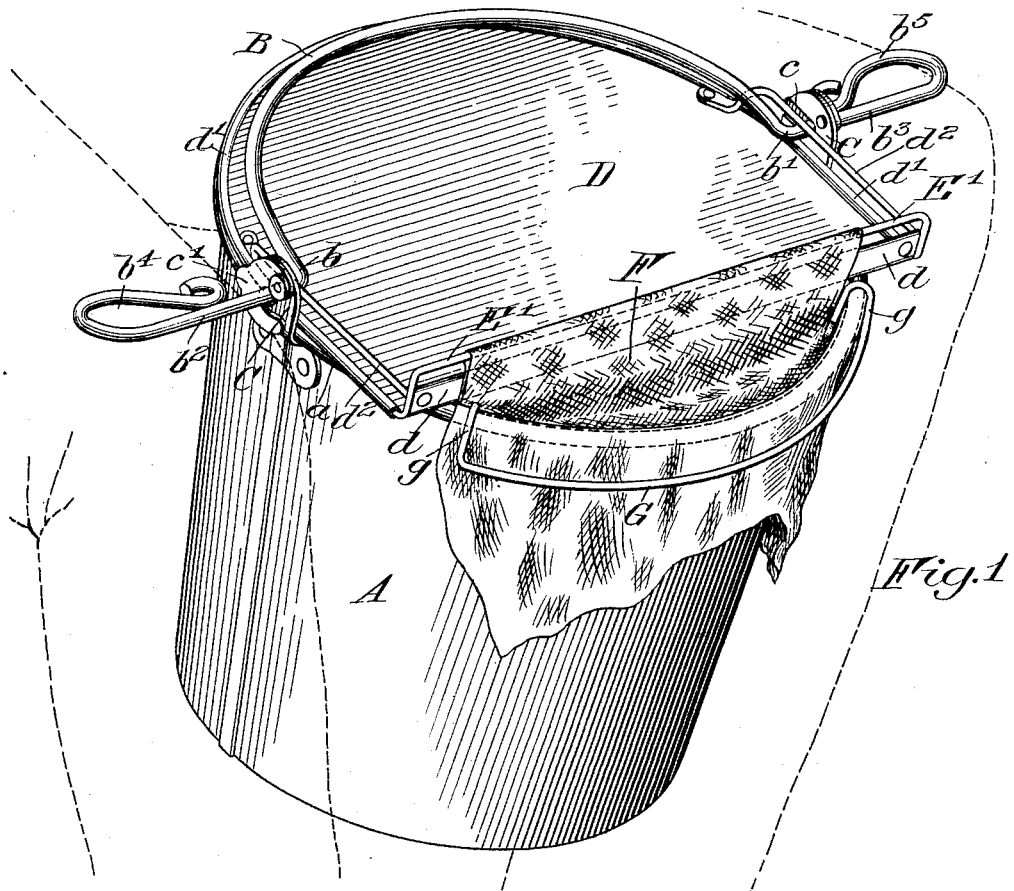
Fig. 1
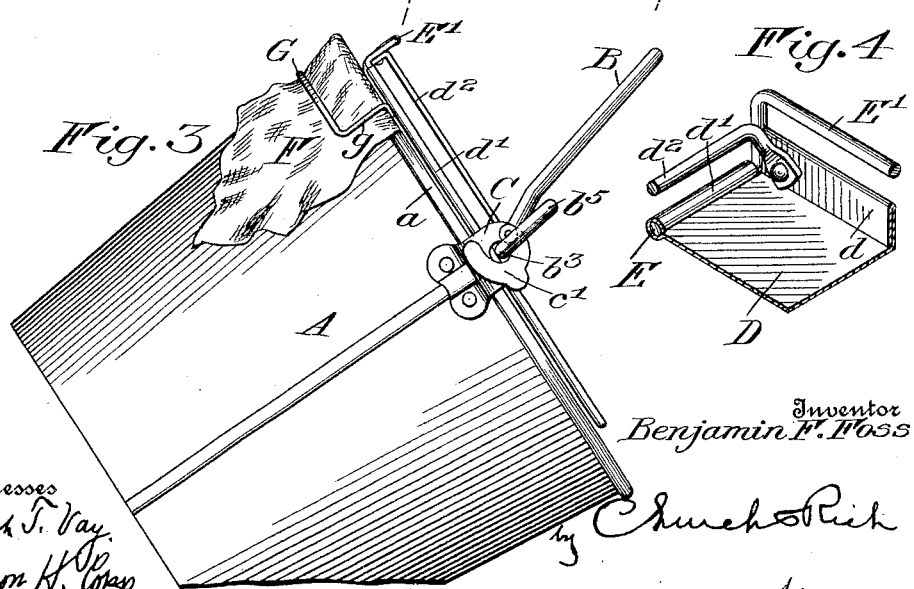
Fig. 3
Fig. 4
Witnesses
Harriet T. Vay
Nelson H. Copp
Inventor
Benjamin F. Foss
by Church & Rich
his Attorneys B. E. FOSS.
DAIRY PAIL.
APPLICATION FILED FEB. 6, 1913.
1,097,415.
Patented May 19, 1914.
2 SHEETS—SHEET 2.
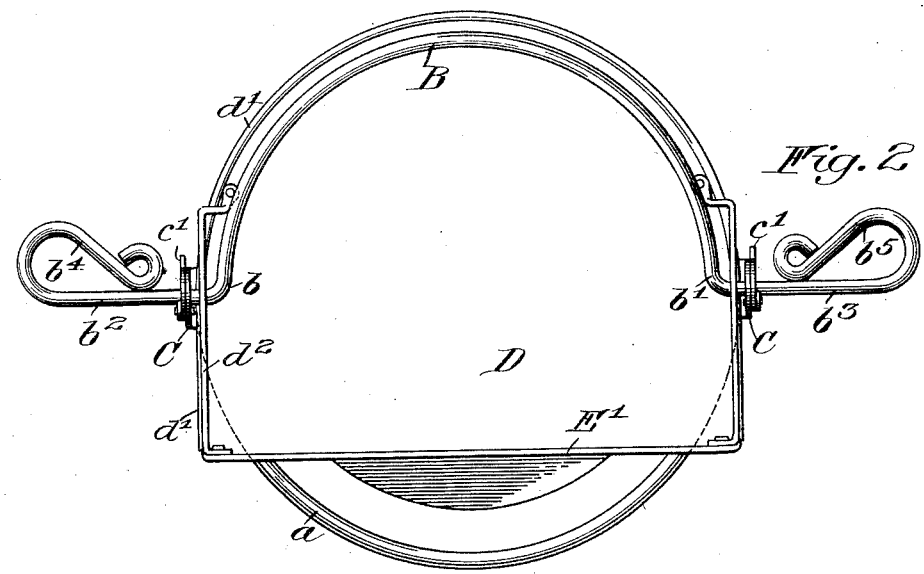
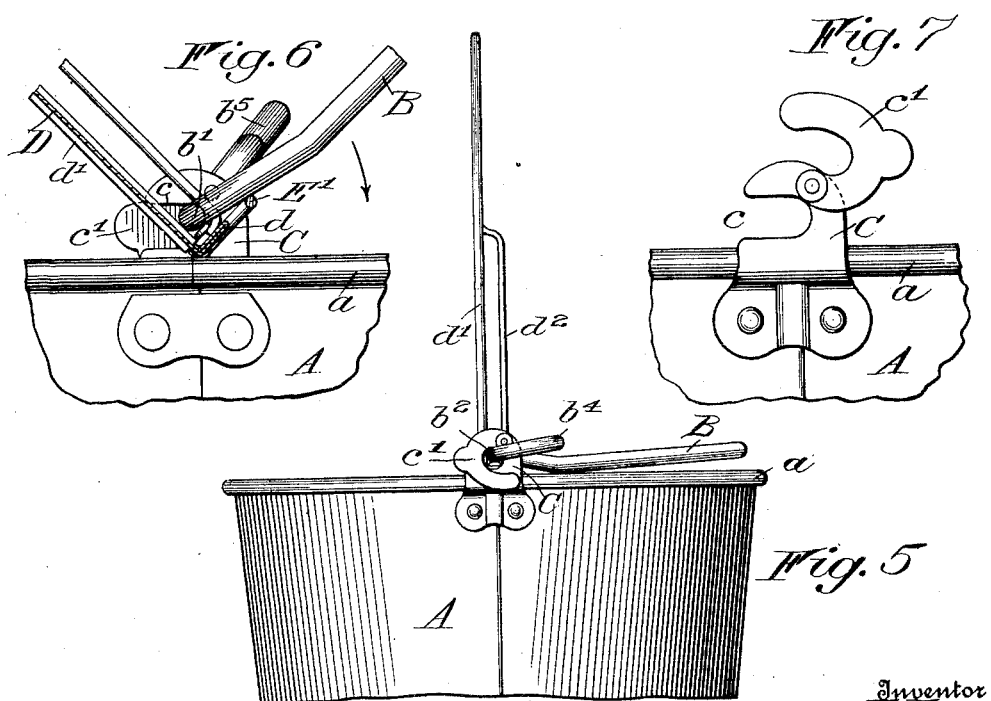
Witnesses
Harriet T. Vay.
Nelson H. Copp
Inventor
Benjamin E. Foss
By Samuel Rich
his Attorneys

UNITED STATES PATENT OFFICE.

BENJAMIN F. FOSS, OF PORTLAND, MAINE, ASSIGNOR OF ONE-HALF TO JOHN F. HORNE, OF PORTLAND, MAINE, AND ONE-HALF TO ROCHESTER STAMPING COMPANY, OF ROCHESTER, NEW YORK, A CORPORATION OF NEW YORK.

DAIRY-PAIL.

1,097,415.     Specification of Letters Patent.     Patented May 19, 1914.

Application filed February 6, 1913. Serial No. 746,456.

*To all whom it may concern:*

Be it known that I, BENJAMIN F. FOSS, of Portland, in the county of Cumberland and State of Maine, have invented certain new and useful Improvements in Dairy-Pails; and I do hereby declare the following to be a full, clear, and exact description of the same, reference being had to the accompanying drawings, forming a part of this specification, and to the reference-numerals marked thereon.

My present invention relates to receptacles or pails adapted particularly to be used for dairy purposes, and it has for its object to provide a pail or receptacle having means for conveniently supporting it between the legs of a person during the operation of milking a cow, together with an adjustable cover which will prevent foreign substances or particles of dirt from entering the pail, and yet provide ample space through which the milk streams may be directed.

My invention has for its further object to provide a detachable bail for a milking pail, having laterally extending end portions serving as a means of supporting the pail, and a cover adapted to be applied to and removed from the receptacle and adjustably held in position on the latter by said bail.

To these and other ends the invention consists in certain improvements and combinations of parts all as will be hereinafter more fully described, the novel features being pointed out in the claims at the end of the specification.

In the drawings: Figure 1 is a perspective view showing a receptacle and the parts thereof constructed in accordance with my invention in about the position in which it is held during the milking operation; Fig. 2 is a top plan view; Fig. 3 is a side elevation showing the receptacle tilted in decanting position; Fig. 4 is a detail perspective view showing one of the corners of the cover; Fig. 5 is a side elevation showing the cover in full open position; Fig. 6 is a detail view showing the cover in another position of adjustment, and Fig. 7 is a detail side elevation of one of the ears for attaching the bail.

Similar reference numerals throughout the several figures indicate the same parts.

My invention is adapted to be applied to a receptacle or pail of the usual or any preferred construction and in the present instance, it is shown as comprising the circular body A having the upper open end surrounded by the rim or bead $a$. The bail comprises the semi-circular handle portion B, the diameter of which is slightly less than the diameter of the open end of the receptacle. The handle portion of the bail terminates at the points $b—b'$ from which extend the bearing portions $b^2—b^3$, the extremities of which are bent over to form the loops $b^4—b^5$ as shown, to provide the leg rests or supports which project laterally in a convenient position to engage the legs of the operator, above the knees, when seated in milking position. The loops $b^4$ and $b^5$ extend on the side of the lateral projections $b^2$ and $b^3$ in the direction of the handle portion B and they may lie in the plane of said handle portion, although I prefer to offset them slightly so that when they are resting on the legs of the operator and are in a substantially horizontal position, the center of the loop or handle portion B will be spaced from the upper edge or rim of the pail, when the latter is suspended vertically. The offset thus provided in the bail permits the operator to tilt the pail between his legs, in the position shown in Fig. 1, without changing the position of the rests or loops $b^4—b^5$, thus permitting the latter to maintain a broad area of contact with the operator's legs. The importance of having a broad surface of contact for the leg rests is very noticeable as the contents of the pail increases, since the load carried in the usual milking pail weighs several pounds when the pail is only partly filled.

The handle or bail is held in position on the receptacle by the ears C attached at opposite sides of the body A and projecting above its upper edge or rim. Each of these ears is slotted, as indicated by $c$, so that the bearing portions $b^2$ and $b^3$ of the bail may be easily inserted therein, and in order to prevent the accidental disengagement of the latter there is pivoted to each ear a hook-shaped locking member $c'$ which may be moved into the position shown in Fig. 7 to release the bail and permit its removal from the receptacle or rotated into the position shown in Figs. 1 and 3 to lock the bail securely thereon.

In order to prevent the contents of the receptacle or pail from contamination, especially during the milking operation, a cover D is provided which is preferably made segmental in shape of such dimensions that the greater portion of the area of the open top of the pail is normally covered, the segmental shape of the cover leaving an opening at one edge of the pail, as shown particularly at Fig. 2, into which the streams of milk may be directed during the milking operation. Owing to the fact that some milkers are more expert than others and also because some cows can be milked with greater facility than others, the cover is mounted so that it may be adjusted transversely of the pail to provide a milking aperture of greater or less width.

The cover is preferably made of sheet metal with a semi-circular rear edge, conforming to the contour of the pail, terminating in the parallel side edges lying within the ears C—C which are connected by the straight front edge. The latter is provided with an upwardly extending vertical lip $d$, and is preferably stiffened by providing the sides and rear edge with a bead $d'$ containing the wire E (Fig. 4) which is shaped to form the portion $E'$, extending parallel to and spaced slightly from the upper edge of the lip $d$, forming a holder for a strainer cloth F which may be loosely arranged in the milking aperture, as shown in Fig. 1, said strainer cloth also being held in position on the edge of the pail by means of a clamp G. This clamp is in the form of a wire having at its ends the hook-shaped portions $g$—$g$ which engage over the rim of the pail. Guiding members or guard rails $d^2$ extend rearwardly from the lip $d$ above the parallel side edges of the cover over the laterally extending ends $b^2$—$b^3$ of the bail. These parts form an adjustable connection between the cover and the bail, which permits a free sliding movement of the cover when it is in operative position on the pail, yet prevents its being separated from the bail and consequently prevents the bail being applied to the pail and the latter used for other purposes than that for which it is intended.

The guide bars extend sufficiently in rear of the pivotal point of the bail, so that when it is desired to empty the contents of the pail, the cover may be moved forwardly to substantially close the milking aperture and provide an opening at the opposite side of the receptacle out of which the contents may be emptied, the parts in this position of adjustment occupying the position shown in Fig. 3.

The lip $d$ arrests particles of dirt or other foreign substances, which may fall onto the cover, from sliding along its surface when this is held in an inclined position owing to the tilting of the pail during the milking operation, and prevents such particles from entering the pail as will be understood.

The strainer cloth holder $E'$, extending above the flange and being offset from the plane of the cover, forms at its end projections which coöperate with the depending ends of the handle portion B of the bail so that the latter will cause the cover to rotate away from the top of the pail, as shown in Fig. 6, when said cover is adjusted into its rearmost position. When the cover is held in this position, a wide aperture is formed between it and the edge of the pail, when the latter is inclined, permitting its contents to be poured out *en masse*, which is desirable, as it facilitates handling the parts during the washing operation. Likewise the coöperating projections between the cover and the bail permit the latter, which is formed of a metal rod, to counterbalance and hold the cover in a vertical position, as shown in Fig. 5, when the pail is not in use and at such times as it may be desired to allow it to become aired and dried after being cleaned.

A receptacle or pail provided with these features of the bail and cover embodying my invention comprises few parts which are simple in construction, easily applied to a pail of standard size and shape and when so employed protects its contents in a satisfactory manner adapting the pail particularly for use in the milking of cows.

I claim as my invention:

1. The combination with a milk pail, and a bail therefor, of a cover for the pail and guides on the latter embracing the bail and permitting a limited adjustment of the cover transversely of the pail.

2. The combination with a pail, having a bail, of a cover for the pail connected to the bail and guided thereon for limited movement transversely of the pail.

3. The combination with a milk pail having ears extending upwardly thereupon and a bail provided with laterally extending bearing portions journaled in the ears, of a cover located beneath said bearing portions, and guide rails on the cover extending over said portions and arranged to permit the cover to be shifted laterally.

4. A milk pail, a bail detachably pivoted thereon, having horizontal portions in alinement with its pivot, of a cover and means forming a connection uniting the cover and bail and permitting the adjustment of the former relatively to the latter when said parts are mounted on the pail.

5. A cover for milk pails, adapted to partially close the pail and having at its edge a holder for a strainer cloth.

6. A pail cover adapted to partially close a milk pail having a transversely extending flanged portion along the edge adjacent the uncovered portion of the top of the pail.

7. A pail cover adapted to close the major portion of the top of a pail and having an upwardly extending flange along the edge bounding the opening formed by the uncovered portion of the top of the pail.

8. A cover for pails shaped to partially cover a pail top and provide an opening at one side thereof, having an upwardly extending protecting flange along the edge adjacent said opening and also provided along said edge with a strainer cloth holder.

9. The combination with a pail, of a cover closing part of the top of the pail and leaving a part open having a holder for securing a strainer cloth along the edge of the cover adjacent said opening and a clamp adapted to detachably engage the edge of the pail to also secure said cloth thereto.

BENJAMIN F. FOSS.

Witnesses:
WILLIAM J. KNOWLTON,
B. M. NEWELL.